US008285148B2

(12) United States Patent
Haunstein et al.

(10) Patent No.: US 8,285,148 B2
(45) Date of Patent: Oct. 9, 2012

(54) SPECTRAL EFFICIENCY ESTIMATION IN COHERENT RECEIVERS

(75) Inventors: Herbert Haunstein, Dormitz (DE); Markus Mayrock, Erlangen (DE)

(73) Assignee: Alcatel Lucent, Paris (FR)

( * ) Notice: Subject to any disclaimer, the term of this patent is extended or adjusted under 35 U.S.C. 154(b) by 516 days.

(21) Appl. No.: 12/462,443

(22) Filed: Aug. 4, 2009

(65) Prior Publication Data

US 2011/0033182 A1     Feb. 10, 2011

(51) Int. Cl.
*H04B 10/04*     (2006.01)
*H04B 10/12*     (2006.01)
*H04B 10/06*     (2006.01)

(52) U.S. Cl. .......................... 398/193; 398/158; 398/208
(58) Field of Classification Search .................. 398/158, 398/193, 208
See application file for complete search history.

(56) References Cited

U.S. PATENT DOCUMENTS

| | | | |
|---|---|---|---|
| 7,756,421 B2 * | 7/2010 | Roberts et al. | 398/158 |
| 2002/0044322 A1 * | 4/2002 | Blumenthal et al. | 359/161 |
| 2010/0178063 A1 * | 7/2010 | Gottwald et al. | 398/175 |

OTHER PUBLICATIONS

M. Mayrock & H. Haunstein; Optical Monitoring for Non-Linearity Identification in CO-OFDM Transmission Systems; Optical Society of America 2007.*
M. Mayrock & H. Haunstein; Monitoring of Linear and Nonlinear Signal Distortion in Coherent Optical OFDM Transmission; Journal of Lightwave Technology, vol. 27, No. 16, Aug. 9.
M. Mayrock & H. Haunstein; Optical Monitoring for Non-Linearity Identification in CO-OFDM Transmission Systems;Optical Society of America 2007.

* cited by examiner

*Primary Examiner* — Nathan Curs
(74) *Attorney, Agent, or Firm* — Carmen Patti Law Group, LLC

(57) ABSTRACT

The present invention relates to optical transmission systems. In particular, the present invention relates to a method and system for estimating the spectral efficiency which may be achievable in an optical transmission network and for adapting the parameters of the transmission network to the achievable spectral efficiency. A method and system for controlling an optical transmission system comprising a first and a second optical transmission channel is described. The first optical transmission channel is affected by the second optical transmission channel. The method comprises the steps of measuring the inverse signal-to-noise ratio of the first channel for a plurality of input power levels used by the first and second channel; determining a contribution of the second channel to the inverse signal-to-noise ratio; and determining the input power to the second channel, such that an overall throughput of the first and second channel is maximized.

20 Claims, 9 Drawing Sheets

SPECTRAL EFFICIENCY ESTIMATION IN COHERENT RECEIVERS

FIELD OF THE INVENTION

The present invention relates to optical transmission systems. In particular, the present invention relates to a method and system for estimating the spectral efficiency which may be achievable in an optical transmission system and for adapting the parameters of the transmission system to the achievable spectral efficiency.

BACKGROUND OF THE INVENTION

Transparent optical networks are in the interest of network operators for many years. They allow for direct optical switching of optical channels through a meshed network. For the operation of such optical networks monitoring is important, in order to identify the degradations incurred by signals which are being transmitted across the networks. There are various sources of degradation which accumulate during propagation over the optical transmission path and these performance limiting effects are to be identified and quantified. Different monitoring techniques have been proposed.

Furthermore, the level of degradations incurred by signals in an optical transmission network may vary in time. Such variations may be due to changes in the environmental conditions of the network, e.g. temperature, surrounding electrical fields, etc. In addition, the level of degradations may depend on the actual load in the network, i.e. on the actual amount of traffic carried within the network.

Linear distortions within an optical channel of an optical network may be compensated by means of digital signal processing. From the equalizer settings at an optical receiver, it is possible to extract information about chromatic dispersion (CD) and polarization mode dispersion (PMD) of the respective optical channel. This information may be used to compensate the linear distortions of an optical channel. These methods for monitoring and compensating linear distortions are particularly relevant when using coherent optical receivers. Furthermore, it should be noted that the use of orthogonal frequency division multiplexing (OFDM) allows for efficient equalization in the frequency domain.

Apart from linear distortions, critical parameters of the optical channel, which limit the achievable throughput of the channel, are the power of amplified spontaneous emission (ASE) noise and further distortions due to non-linear effects. The signal degradation which results from these effects accumulates during propagation along the optical transmission line and can typically only be fully characterized at the final destination, i.e. at the optical receiver.

SUMMARY OF THE INVENTION

In order to provide extended information on the transmission properties of an optical network, i.e. on the transmission properties of each optical channel in an optical network, an estimate of the ASE noise and other fiber non-linearity is desirable. It is further desirable to provide an estimate on the spectral efficiency and the achievable maximum throughput of the optical network and its channels. In addition, it is desirable to provide an optical transmission system which may be adjusted to the currently available spectral efficiency of the optical network and its channels. Furthermore, it is desirable to be able to perform the above mentioned tasks online, on a regular basis, and at low computation complexity, in order to take into account varying network conditions.

In the following, several aspects of the proposed methods and systems are outlined. According to a first aspect a coherent optical receiver is described. The receiver typically comprises a coherent optical reception unit which is operable to receive an optical signal sent by a corresponding optical transmitter over a first optical transmission channel of an optical transmission network. As will be outlined in further detail below, such a coherent optical reception unit may comprise optical polarization beam splitters, a laser for generating a local oscillator signal, as well as hybrid units. It typically provides an optical signal which has been down-converted to a lower intermediate frequency band or to the baseband centered around the zero frequency. The optical receiver may further comprise an optical-to-digital converter which is operable to convert the optical signal into a digital signal. Such conversion from the optical domain to the digital domain may be performed with the intermediate step of a conversion into the analog electrical domain using photodetectors. In a subsequent step, the analog electrical signal may be converted into the digital domain using analog-to-digital converters.

The optical receiver may further comprise a digital post-processing unit. Such a digital post-processing unit may be implemented as a programmable digital signal processor. It may also be implemented in the form of ASICs and other means of digital signal processing. The post-processing unit is typically operable to perform linear equalization of distortions incurred by the optical signal during transmission over the first channel. In other words, the post-processing unit may estimate the coefficients of an FIR (finite impulse response) filter, e.g. by using mean square error minimization techniques. These filter coefficients are also referred to as the equalization settings and represent a linear model of the transfer function of the first optical transmission channel.

The post-processing unit may further be operable to provide measured data by measuring the inverse signal-to-noise ratio of the first channel for a plurality of input power levels used by the first channel and a second optical transmission channel of the optical transmission network. The setup of the optical transmission network is such that the second channel affects, disturbs or influences the first channel, i.e. that the transmission of an optical signal over the second channel has an influence on the signal-to-noise ratio in the first channel. This may be due to cross-talk between the two channels along the whole or parts of the first transmission channel.

In addition, the post-processing unit may determine a contribution of the second channel to the inverse signal-to-noise ratio of the first channel based on the measured data and determine the input power level to the second channel, such that an overall throughput of the first and second channel is maximized. This may be done using any combination of the features outlined in the present document.

The receiver may further comprise an interface to a control plane of the optical transmission network operable to exchange information about the input power levels used by the first and second channel with the corresponding transmitter of the first channel and a corresponding transmitter of the second channel, respectively. This interface may be further operable to exchange information regarding the contribution of the second channel to the inverse signal-to-noise ratio of the first channel. In a typical WDM (wavelength division multiplexing) transmission network comprising a plurality of transmitters, a plurality of receivers and a plurality of possibly interacting optical transmission channels, such communication via a control plane may be performed between multiple transmitters and/or receivers. In transparent optical networks or ASONs (automatically switched optical networks) the communication may be performed using GMPLS (generalized multiprotocol label switching), which provides a suite of protocols for resource reservation (RSVP), exchange of topological information between the network elements (e.g. transmitters and receivers), routing (OSPF-TE) and/or traffic engineering (LMP).

According to another aspect, an optical transmitter of a second optical transmission channel is described. As outlined above, the second channel affects or influences or perturbs a first optical transmission channel in an optical transmission network. The transmitter typically comprises an optical laser operable to generate an optical signal of the second channel with a modifiable input power level. In other words, the power of the laser light sent into the second channel may be varied. The transmitter may also comprise an interface operable to exchange information with other elements or nodes in the optical transmission network. In particular, the interface may allow the exchange of information with an optical receiver of a first optical transmission channel. As outlined above, the exchange of information may be based on the protocol suite of GMPLS and/or possible extensions. The transmitter may further comprise a digital processing unit.

The interface may be used to receive measured data on the inverse signal-to-noise ratio of the first channel for a plurality of input power levels used by the first and the second channel. It should be noted that the different measurements required for generating the measured data may e.g. be triggered by the transmitter. Alternatively, the measurements may be triggered by the receiver of the first or second channel. As another alternative, the measurements may be triggered by a central coordination unit of the optical transmission unit, e.g. a network management center or a network monitoring unit. It should be noted that this also applies to the other aspects outlined in the present document.

The digital processing unit may determine a contribution of the second channel to the inverse signal-to-noise ratio of the first channel based on the measured data and it may determine the input power to the second channel, such that an overall throughput of the first and second channel is maximized.

According to a further aspect a control unit operable to control an optical transmission system comprising a first and a second optical transmission channel is described. The control unit may monitor the optical transmission system and provide information to other units of the optical transmission system. As such, the control unit may also be referred to as a monitoring unit. By way of example, the control unit may provide monitored information to a network control layer or control plane which manages the overall data throughput through an optical meshed network.

The optical transmission system or optical network comprises a plurality of optical channels. These channels may use orthogonal frequency division multiplexing and/or orthogonal polarization. The optical transmission system may also use other optical modulation and transmission schemes. It should be noted that a plurality of transmission channels may be combined in a wavelength division multiplexing (WDM) system.

The above mentioned first optical transmission channel may be affected by the second optical transmission channel. This is typically due to crosstalk from the second channel over to the first channel. This effect may be referred to as cross phase modulation (XPM).

The control unit typically comprises a measurement unit, operable to provide measured data by measuring the inverse signal-to-noise ratio of the first channel for a plurality of input power levels used by the first and second channel. The measurement unit may also measure the direct signal-to-noise ratio of the first channel and then invert the measured data. The input power levels used by the first and second channels may be varied independently from one another. In other words, the input power used at the transmitter of the first channel may be modified independently from the input power used at the transmitter of the second channel. The control unit may provide control information to the respective transmitters which set the respective input power levels.

The signal-to-noise ratio or the inverse signal-to-noise ratio is typically measured at the corresponding receivers of the optical transmission channels. As such, the control unit may request the receiver of the first and/or second channel to provide measured data relating to the signal-to-noise ratios at the currently set levels of input power.

In particular, the measurement unit may be operable to provide measured data by measuring the inverse signal-to-noise ratio of the first channel
- at a first value of the input power used by the first channel, while the input power used by the second channel is at a second value. This yields a measured data $m_0$ of the inverse signal-to-noise ratio.
- at the first value increased by a value $10 \lg(k)$ of the input power used by the first channel, while the input power used by the second channel is at the second value. This yields a measured data $m_1$ of the inverse signal-to-noise ratio. The value k is typically a positive real number.
- at the first value of the input power used by the first channel, while the input power used by the second channel is at the second value increased by the value $10 \lg(k)$. This yields a measured data $m_2$ of the inverse signal-to-noise ratio.

In other words, the inverse signal-to-noise ratio of the first channel may be measured for at least three different configurations of the input power level used by the first and second channel. This provides three measured data $m_0$, $m_1$ and $m_2$, which may be used as a basis for determining a contribution of the second channel to the inverse signal-to-noise ratio of the first channel.

The value $10 \lg(k)$, where lg is the logarithm at basis 10, and/or the corresponding value k may be selected such that the optical transmission channels are operated in a range where they can be considered to be "weakly non-linear" systems. At the same time, it may be beneficial to select relatively large values of $10 \lg(k)$ and/or k, in order to obtain measured data from operating points which are relatively far apart from each other.

It should be noted that the inverse signal-to-noise ratio is typically determined for an equalized received signal. In other words, it is typically assumed that the linear distortions of an optical transmission channel have been compensated at the receiver, such that the inverse signal-to-noise ratio solely reflects non-linear distortions and noise incurred in the optical transmission channel.

The control unit may further comprise a calculation unit, operable to determine a contribution of the second channel to the inverse signal-to-noise ratio of the first channel based on the measured data. The calculation of the contribution may be performed based on the assumption that the contribution of the second channel to the logarithmic inverse signal-to-noise ratio of the first channel increases by 2 dB per 1 dB increase of the input power used by the second channel.

The calculation unit may further be operable to determine a contribution of self phase modulation to the inverse signal-to-noise ratio and/or amplified spontaneous emission to the inverse signal-to-noise ratio. In other words, the part of the inverse signal-to-noise ratio of the first channel which is due self phase modulation of the first channel may be determined. Furthermore, the part of the inverse signal-to-noise ratio of the first channel which is due amplified spontaneous emission of the first channel may be determined.

The calculation may be based on the assumption that the contribution of amplified spontaneous emission, the contribution of self phase modulation and the contribution of the second channel add up to the total inverse signal-to-noise ratio of the first channel. In particular, the calculation may use the measured data $m_0$, $m_1$ and $m_2$ and the following formulas to determine the different contributions:

the contribution of the second channel may be given by $$\frac{N_{XPM}}{S} = \frac{m_2 - m_0}{k^2 - 1};$$

the contribution of self phase modulation may be given by $$\frac{N_{SPM}}{S} = \frac{-km_0 + k(k+1)m_1 - m_2}{(k+1)(k^3 - 1)}; \text{ and}$$

the contribution of amplified spontaneous emission may be given by $$\frac{N_{ASE}}{S} = m_0 - \frac{N_{SPM}}{S} - \frac{N_{XPM}}{S}.$$

The control unit may further comprise an optimization unit, operable to determine the input power to the second channel, such that an overall throughput of the first and second channel is maximized. This may be done by minimizing the sum of the inverse signal-to-noise ratio of the first channel and an inverse signal-to-noise ratio of the second channel.

It should be noted that the overall throughput may be understood as the overall throughput which is theoretically achievable by the optical transmission system in case optimal transmission schemes are used. Furthermore, the overall throughput may be understood as the overall throughput which may be practically achieved through the use of available transmission schemes, such as OFDM and/or polarization multiplexing and/or coherent detection and/or forward correction error encoding. In order to actually maximize the throughput of the optical transmission network, the control unit may provide information to a network control layer and/or the transmitters/receivers of the optical transmission channels. This information may comprise information with regards to the input power levels which should be used for the optical channels of the optical network. Furthermore, the information may comprise information with regards to the inverse signal-to-noise ratio and/or their ASE, SPM and XPM contributions of the optical transmission channels at the suggested input power levels. This information may be used by the control layer and/or the transmitters/receivers for increasing the actual data throughput through the optical network.

According to a further aspect, an optical transmission network which comprises a first and a second optical transmission channel and a control unit for determining optimum input power levels to the first and second channel is described. The control unit may comprise any of the features outlined in the present document.

The optical transmission network may further comprise a first optical transmitter associated with the first channel and a second optical transmitter associated with the second channel. Furthermore, it may comprise a setting unit for setting an input power of the first and second channel according to the optimum input power levels determined in the control unit.

In addition, the optical transmission network may comprise a throughput determination unit, operable to determine a maximum possible throughput of the first channel at the optimum input powers. As already outlined above, the determination unit may also be part of the control unit. Alternatively, the control unit may make use of such determination unit within the optical transmission network, in order to determine the input power levels in its optimization unit.

The first optical transmitter may be operable to transmit an optical signal at a first data rate and the first optical transmitter may be operable to adapt the first data rate to the maximum possible throughput. If the first optical transmitter is an optical OFDM transmitter, it may be operable to adapt a modulation constellation, in order to adapt the first data rate.

According to another aspect a method for controlling an optical transmission system comprising a first and a second optical transmission channel is described. The first optical transmission channel may be affected by the second optical transmission channel, e.g. due to XPM. The method may comprise the step of measuring the inverse signal-to-noise ratio of the first channel for a plurality of input power levels used by the first and second channel. It may further comprise the step of determining a contribution of the second channel to the inverse signal-to-noise ratio. Eventually, the method may comprise the step of determining the input power to the second channel, such that an overall throughput of the first and second channel is maximized.

It should be noted that a typical optical transmission network, e.g. a WDM network, comprises a plurality of optical transmitters and optical receivers. Preferably, the transmitters, the receivers and/or a central network unit, such as a control unit or a network management center, may coordinate the methods and aspects outlined in the present document. By way of example, a central network unit may trigger the measurement of the inverse signal-to-noise ratios of the different optical transmission channels. In a network comprising W optical channels, W+1 measurements may be required at the optical receiver of one optical channel, in order to determine the contribution of the remaining optical channels to the inverse signal-to-noise ratio of this particular one channel. By consequence, W×(W+1) measurements would be required for a complete modeling of the non-linear distortion and/or transfer properties of the optical transmission network.

These measurements could be performed at different time instants. By way of example, the measurements may be performed for the different optical channels in a cyclic manner. Alternatively or in addition, the measurements could be performed in different frequency bands. This is particularly useful for optical OFDM transmission systems, where the measurements could be performed in different OFDM subbands. For this purpose different pilot tones could be used. By using different frequency bands for different measurements, multiple measurements could be performed at the same time.

The measurements could be performed at the initialization of an optical channel within an optical network. Preferably, the measurements are performed at pre-defined time intervals and/or as a result of certain pre-defined events, in order to measure changes in the overall throughput performance of the optical channels. Such events could e.g. be the adding or the removal or the switching of an optical channel which may affect the other operating channels. The performance of the optical channels may also be affected by environmental changes, such as changes of the ambient temperature.

As a result of the measurements, the input power levels used by the different optical transmission channels in the network may be optimized. This could be used to improve the overall throughput of the optical network, which may be achieved by modifying the transmission parameters of particular optical channels. If for example it is determined that the signal-to-noise ratio of a certain channel is sufficiently high, the data rate on this particular channel may be increased. This could e.g. be done by changing the modulation scheme of that channel.

The measurements and the evaluation of the non-linear network parameters according to the present document may be performed centrally by a central coordination unit or decentrally by the different network elements, i.e. notably the transmitters and/or receivers. In order to allow for a communication between the different network elements and/or the central units, use is preferably made of the control planes of the different network elements and of the protocols in the control plane (e.g. GMPLS). For this purpose, the different network elements preferably comprise interfaces which allow for the exchange of measurement and/or control data.

Before describing preferred embodiments, it should be noted that the methods and systems outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DETAILED DESCRIPTION OF EMBODIMENTS

In the following, a method for modeling an optical transmission system comprising linear and non-linear components is described. The determined system model may be used for monitoring purposes, i.e. for extracting information with regards to the current network conditions, notably with regards to the current achievable throughput of the network.

In order to identify the level of non-linearity of the underlying transmission system, it is proposed to first perform a spectrum estimation of a representative linear component of the transmission system. Subsequently, an equivalent noise spectrum is determined for the non-linear distortion contribution. Since the approach operates in the frequency domain, it is well adapted for the application in orthogonal frequency division multiplexing (OFDM) systems. As a consequence, the sub-carrier processing used for determining information with regards to ASE and fiber non-linearity may be implemented with low computational complexity.

Figure 1:
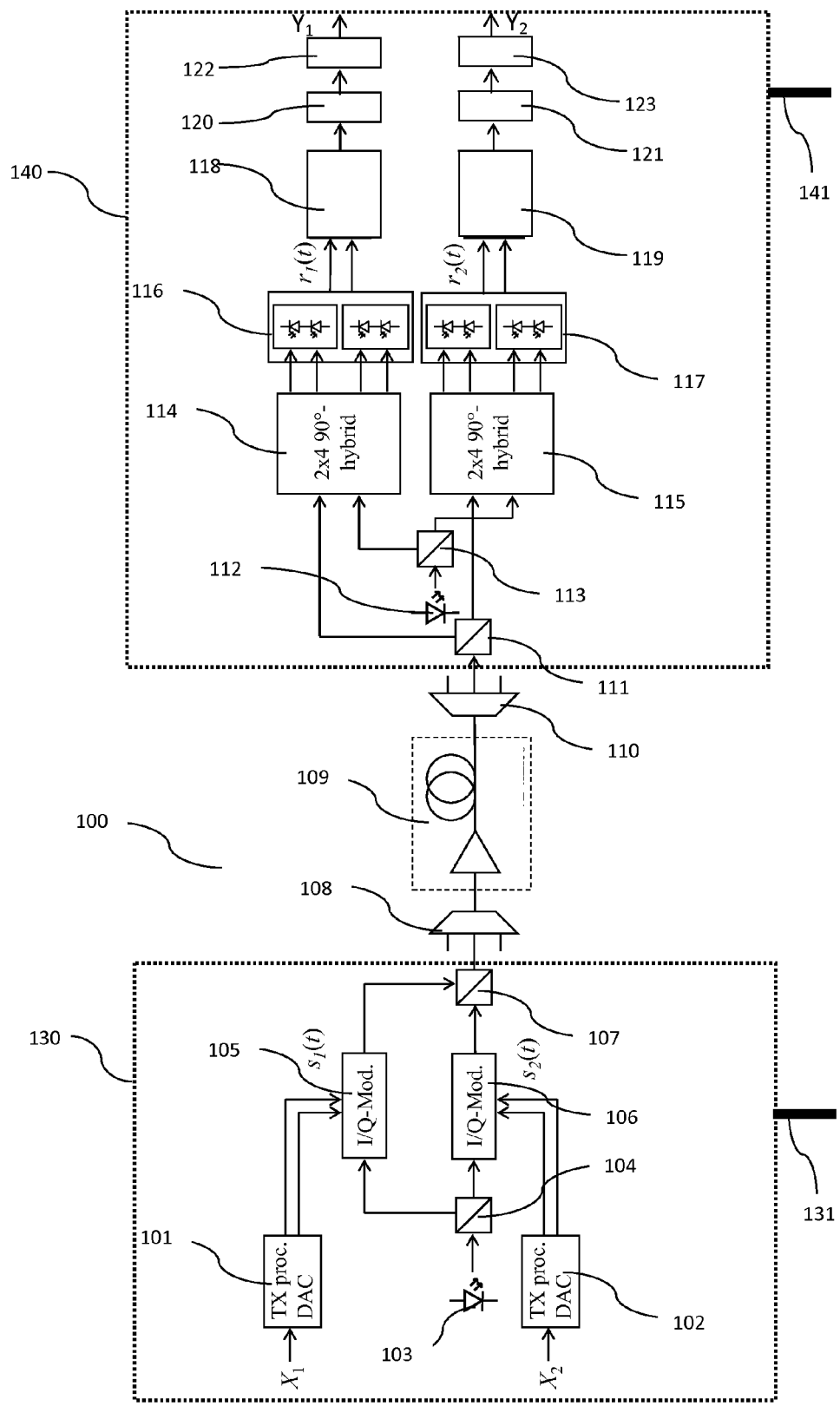
FIG. 1 illustrates an exemplary optical transmission system using orthogonal polarization.

FIG. 1 depicts an exemplary transmission system 100. In particular, FIG. 1 illustrates an optical transmission system 100 using polarization division multiplexing (PDM) of two independently phase modulated signals—e.g. two QAM (quadrature amplitude modulated) signals. Such optical transmission systems 100 typically have a higher spectral efficiency compared to non-polarization diverse transmission schemes. In a coherent receiver 140, such PDM signals may be polarization de-multiplexed and distortion compensated by means of digital signal processing. Next generation transponders for terrestrial networks using bit-rates of 40 Gb/s and 100 Gb/s are expected to be based on polarization multiplexed QAM (PDM-QAM) modulation or PDM-QPSK modulation and coherent detection schemes. Using this technology, DCM-free transmission (i.e. transmission based on fibers without dispersion compensation), very high PMD tolerance and the use of 50 GHz spaced ROADMs (reconfigurable optical add-drop multiplexer) will become possible by digital signal processing (DSP) in the optical receiver 140.

At a PDM-QAM transmitter 130 two independent digital baseband signals $X_1$ and $X_2$ are typically processed in processing units 101 and 102, respectively. These units 101,102 also comprise digital-to-analog converters (DAC). The PDM-QAM transmitter 130 also comprises a laser 103 generating an optical carrier signal. The optical carrier signal is split 104 and fed to a first IQ-modulator 105 and a second IQ-modulator 106. The first IQ-modulator 105 is used for phase modulating a first polarization component of the combined optical output signal with the first baseband signal $s_1(t)$. The second IQ-modulator 106 is used for phase modulating a second orthogonal polarization component of the combined optical output signal using the second baseband signal $s_2(t)$. Then the two modulated orthogonally polarized and modulated TX laser signals are recombined in the polarization beam combiner 107. The resulting optical signal may be referred to as a PDM-QAM signal. Such a PDM-QAM signal may be multiplexed with other wavelengths in multiplexing unit 108 and transmitted over an optical transmission medium 109. Transmission systems using a plurality of wavelengths are typically referred to as Wavelength Division Multiplexing (WDM) systems.

In addition, the transmitter comprises an interface 131. This interface may be used to exchange information with other network elements and/or a network management center. The exchanged information may comprise among others, the power input levels used by the laser 103, inverse signal-to-noise ratios measured at optical receivers and/or control information regarding the data rates/modulation schemes.

The PDM-QAM signal is transmitted over an optical fiber 109 and typically incurs distortions caused by linear and non-linear distortion effects in the optical fiber 109, such as chromatic dispersion (CD) and polarization mode dispersion (PMD). CD is the phenomenon that the phase velocity of a wave depends on its frequency. In order to compensate these linear distortions, PDM-QAM receivers 140 regularly comprise equalizers or compensators which are trained and/or continuously adapted to model the impulse response of the optical transmission channel.

Such a receiver 140 comprising polarization diverse coherent detection is shown in FIG. 1. The received optical signal is de-multiplexed (unit 110) and the received PMD-QAM signal of respective wavelength is split into two polarizations in the polarization beam splitter 111. A local oscillator 112 signal is also split into two polarizations using polarization beam splitter 113. In hybrid units 114 and 115, the respective received signal and the LO signal are superimposed in order to perform a down-conversion into the baseband. Then the down-converted signals are converted into analog electrical signals using the balanced photodetectors 116, 117. Finally, the received analog electrical signals are converted into the digital domain using analog-to-digital converters (ADC) 118, 119. The received digital signals are then submitted to post-processing 120, 121, prior to entering decision units 122, 123, where the received and post-processed digital signal is assigned to constellation points, e.g. QAM constellation points.

The receiver 140 also comprises an interface 141, in order to exchange information with other network elements and/or a central network management center. For this purpose, the network elements typically make use of control plane protocols such as GMPLS.

In the illustrated exemplary transmission line, the overall bit-rate is 100 Gb/s and the underlying OFDM system parameters are as follows: 256 sub-carriers, 16QAM, relative cyclic prefix length of 12.5%.

It should be noted that the optical transmission system using OFDM and/or polarization multiplexing shown in FIG. 1 is only an example for an optical transmission system. The methods and systems proposed in the present document may also be applied to other optical transmission networks, e.g. optical transmission networks which do not make use of optical polarization.

The above optical transmission system is preferably operated at an operating point, where it can be considered to be a "weakly non-linear" system, i.e. where the system still can be treated as a linear system which is affected mainly by an additive distortion. The operating point is mainly determined by the level of the optical input power to the optical channel at the transmitter, i.e. by the power of the TX laser 103. Such "weakly non-linear" systems may be modeled by the model 200 illustrated in FIG. 2. In the absence of amplified spontaneous emission (ASE) noise, the transmission system may be modeled by a linear transfer function H 201 incorporating linear distortions and a second block $S_N$ 202 which accounts for non-linear effects.

Figure 2:
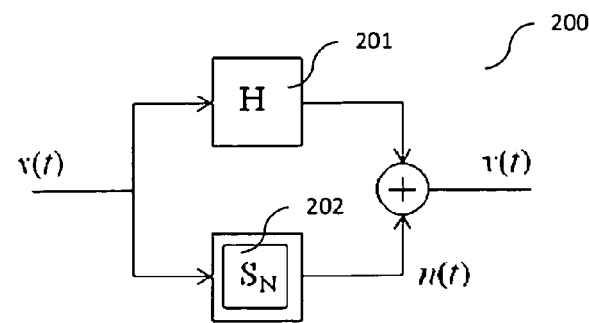
FIG. 2 shows an exemplary model of a transmission system comprising linear and non-linear components.

In the case of an OFDM transmission system, the model of FIG. 2 may be described as a set of Q orthogonal narrow band 2×2-MIMO-channels $$\begin{bmatrix} Y_1(d) \\ Y_2(d) \end{bmatrix} = \begin{bmatrix} H_{11}(d) & H_{12}(d) \\ H_{21}(d) & H_{22}(d) \end{bmatrix} \cdot \begin{bmatrix} X_1(d) \\ X_2(d) \end{bmatrix} + \begin{bmatrix} n_1(d) \\ n_2(d) \end{bmatrix}, d = 1...Q \quad (1)$$

wherein Q is the number of OFDM sub-carriers. $Y_i(d)$ and $X_i(d)$, for i=1,2, represent the $d^{th}$ sub-band of the output signal and the input signal, respectively. The matrix entries $H_{ij}(d)$ of the linear transfer function H represent linear distortions of the subcarriers d and correspond to the linear transfer function H 201 of FIG. 2; $n_1(d)$ and $n_2(d)$ denote additive noise samples within both receive branches and correspond to the second block $S_N$ 202 of FIG. 2 which accounts for non-linear effects. In addition to the non-linear effects, $n_1(d)$ and $n_2(d)$ also account for amplified spontaneous emission (ASE) noise.

The linear transfer function matrix H can be determined by minimizing the mean square value of the noise vector $$N = \begin{bmatrix} n_1(d) \\ n_2(d) \end{bmatrix}.$$

For the purpose of estimating the linear channel coefficients, pilot symbols may be used, which are known to the receiver. It should be noted that in the case of the OFDM transmission system of FIG. 1 orthogonal vectors of pilot symbols are required. This may be achieved by transmitting the pilot symbol $X_p(d)$ in just one polarization, while the other branch transmits 0, i.e. by successive transmission of $[X_p(d), 0]^T$ and $[0, X_p(d)]^T$. Alternatively or in addition, the estimation of the linear channel coefficients may be performed by making use of the received data $[Y_1(d), Y_2(d)]^T$ after decision at the receiver. The received data after decision can then be considered to be the input data $[X_1(d), X_2(d)]^T$ that was sent over the optical transmission system.

Figure 2A:
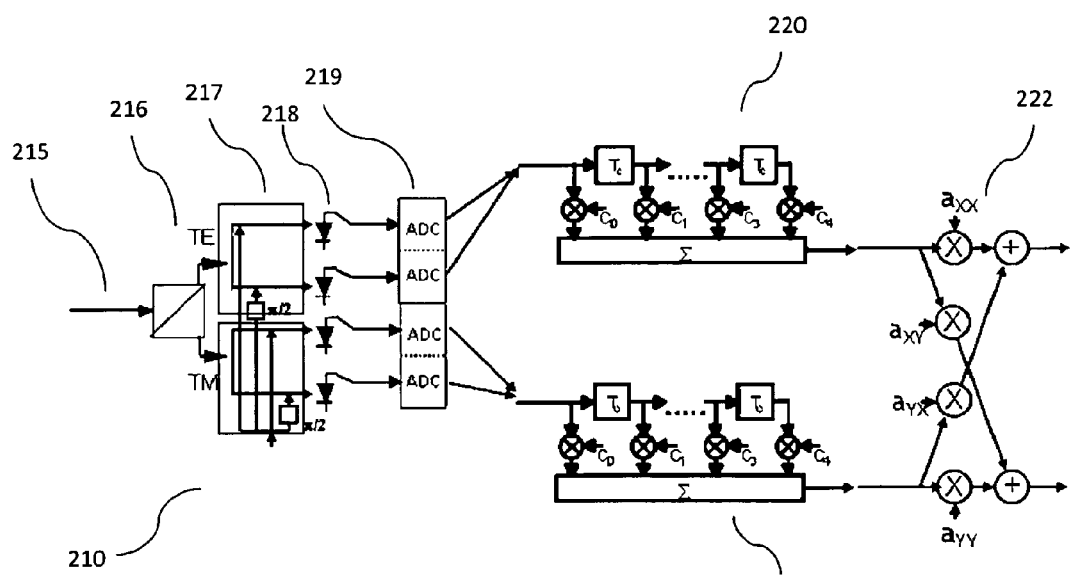
FIG. 2a illustrates an exemplary optical receiver comprising a digital post-processing unit with linear equalization and polarization de-multiplexing.

It should be noted that the linear transfer function H may also be determined at the receiver in the context of equalization of linear optical effects such as CD and PMD. Such a receiver 210 with CD/PMD compensation and polarization de-multiplexing is shown in FIG. 2a. A PDM signal, e.g. a PDM-QAM signal, is received over an optical fiber 215 and passes through a polarization splitter 216 in order to isolate two polarization planes or components of the combined signal, which may be post-processed in the optical or the electrical domain to obtain the original polarization components of the combined PDM signal. Both components pass through demodulators 217 and optical detectors 218, thereby yielding the I and Q sub-components of each polarization component, i.e. the in-phase and the quadrature-phase sub-components of each polarization component. In a next step, these signals may be digitized in a bank of analog-to-digital converters 219 in order to allow for equalization in the digital domain.

Compensation of chromatic dispersion and/or polarization mode dispersion may be performed by a set of finite-impulse response (FIR) filter banks 220, 221. In FIG. 2a, the FIR filters 220, 221 have an order of five, but any order of equalization filters may be used. In general, a higher filter order should yield a better result for the compensation of chromatic dispersion and/or polarization mode dispersion.

The next equalization stage is mainly related to the compensation of distortions related to the polarization of the transmitted combined signal and referred to as polarization de-multiplexing 222. By mixing the two signal components, it is possible to compensate certain interactive effects between both polarization components and notably a tilting of the polarization planes may be compensated. As a matter of fact, a polarization de-multiplexer may be required as the optical receiver is not aware of the orientation of the polarization planes of the received PDM signal. As an output of the polarization de-multiplexing stage 222, the compensated signals are obtained. These compensated signals may be used as the input signals to the decision units 122, 123 of FIG. 1.

The equalization parameters can be determined by the use of training data and/or by adaptive optimization schemes exploiting known characteristics of the received PDM-QAM signal, wherein the latter scheme is also referred to as blind equalization. For the determination of the equalization parameters in a blind equalizer, the so-called constant modulus algorithm (CMA) is frequently used to adapt the FIR taps $c_i$, for CD compensation and the polarization de-multiplexing taps $a_{xx}$, $a_{xy}$, $a_{yx}$ and $a_{yy}$. The purpose of equalization is the possibility to achieve higher transmission distances using a given optical input power or to be able to reduce the optical input power for a given transmission distance, thereby reducing the extent of non-linear effects on the optical fiber. Furthermore, the equalization parameters or taps constitute the linear transfer function H, or more specifically the equalization taps constitute the inverse linear transfer function H. It should also be noted that the equalization stage and the polarization de-multiplexing stage may be implemented in the digital post-processing units 120, 121 shown in FIG. 1.

Once the linear transfer function H has been determined, the total additive noise may be determined by rewriting equation (1). Then the inverse signal-to-noise ratio (SNR) may be determined for both receive branches i=1, 2, i.e. for both polarizations:

$$\begin{bmatrix} n_1(d) \\ n_2(d) \end{bmatrix} = \begin{bmatrix} Y_1(d) \\ Y_2(d) \end{bmatrix} - H(d) \begin{bmatrix} X_1(d) \\ X_2(d) \end{bmatrix}; \quad (2)$$

$$\frac{N_i}{S_i} = \frac{\sum_{d=1}^{Q} |n_i(d)|^2}{\sum_{d=1}^{Q} |H_{i1}(d)X_1(d) + H_{i2}(d)X_2(d)|^2}, \quad i \in \{1, 2\},$$

where $N_i = \sum_{d=1}^{Q} |n_i(d)|^2, i \in \{1,2\}$ is the power of the distortion in the polarization branch i. In a similar manner, $S_i = \sum_{d=1}^{Q} |H_{i1}(d)X_1(d) + H_{i2}(d)X_2(d)|^2, i \in \{1, 2\}$ is the power of the signal in the polarization branch i.

$$\frac{N_i}{S_i}$$

is the inverse signal-to-noise ratio in the polarization branch i.

The advantage of the description as an inverse SNR is the observation that the noise power may be a sum of different kinds of distortion, i.e. notably a distortion due to ASE, a further distortion due to self phase modulation (SPM), and in the presence of neighboring channels a further distortion due to cross phase modulation (XPM) or crosstalk. Under certain conditions the individual contributions of the different kinds of distortion can be determined.

Figure 3:
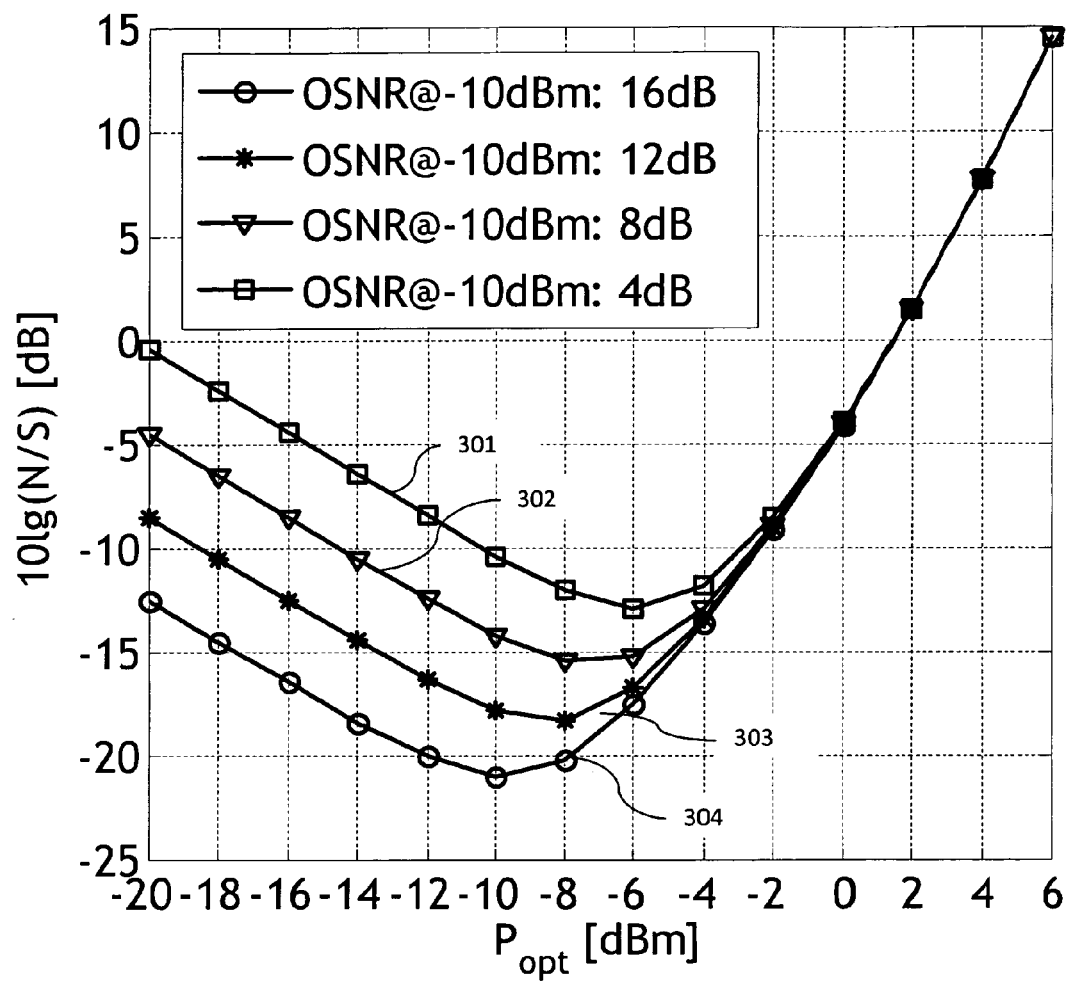
FIG. 3 shows the distortion ratio as a function of optical input power for an exemplary optical transmission system.
Figure 4:
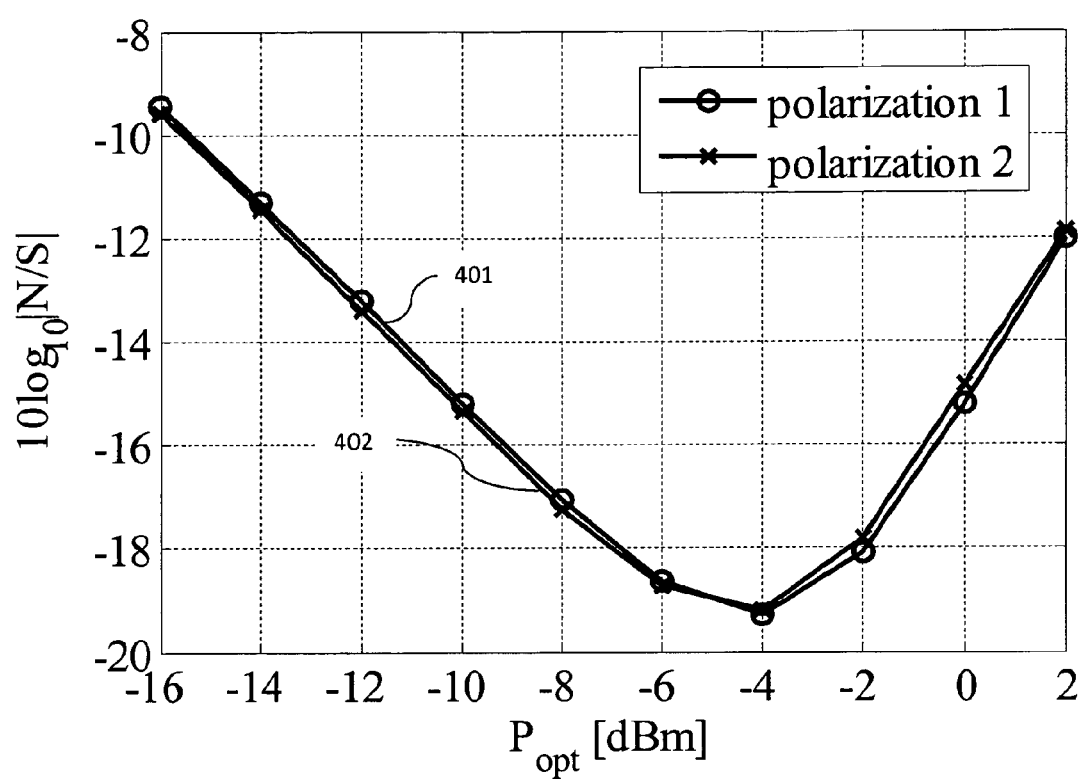
FIG. 4 shows the distortion ratio as a function of optical input power for an exemplary optical transmission system using orthogonal polarization.

FIGS. 3 and 4 show exemplary inverse SNRs versus the optical input power of the optical transmission channel in a logarithmic diagram. In other words, FIGS. 3 and 4 illustrate the inverse SNRs at different operating points of the optical transmission channel. FIG. 3 depicts the power of the distortion N versus optical input power $P_{opt}$ (for P optical) in a transmission system which does not make use of orthogonal polarization. The power N of the distorting signal is normalized to the power S of the useful signal. Thus, the ordinate shows inverse signal-to-noise power ratios. The diagram shows four curves which correspond to different OSNR (optical signal to noise ratio) values at the receiver for an optical input power of −10 dBm. The OSNR is defined as the power of the useful signal over ASE noise power, which is determined within a reference bandwidth of 0.1 nm. Parameters like optical amplifier gain and noise-figure typically have influence on the OSNR which is present at the receiver. As can be seen from FIG. 3, small measures of the optical input power $P_{opt}$, i.e. in the range less than approximately −10 dBm, operate the system in the linear regime. Four parallel straight lines 301, 302, 303, 304 can be observed. The relative distortion 10 lg(N/S) decays by one dB when the input power is increased by one dB. This distortion can mainly be contributed to ASE noise.

At a certain input power level $P_{opt}$, fiber non-linearity comes into play and causes increasing signal distortion. It can be observed that there is an increasing distortion ratio or inverse SNR N/S starting in the range of −10 dBm to −6 dBm, depending on the OSNR. The relative distortion increases by about 2 dB per 1 dB optical power increment. In this range, the distortion is mainly caused by non-linear effects of the optical fiber. In the illustrated case, these distortions are mainly due to self phase modulation (SPM) of the optical fiber.

It should be noted that for the exemplary case shown in FIG. 3, the above mentioned approximately linear relation between the logarithmic distortion ratio N/S and the optical input power level $P_{opt}$ is only applicable up to a certain maximum input power $P_{opt}$. As can be seen from FIG. 3 there is an even larger slope than 2 dB increase of the distortion ratio per 1 dB increase of the input power beyond and above approximately $P_{opt}$=0 dBm. In this range of the input power, the system can typically not be regarded as being a weakly non-linear system anymore. However, due to the fact that typically the optical transmission system exhibits relatively high distortions for such ranges of the input power, a modeling of the transmission system for such ranges is not required. In other words, typically the optical transmission system is not used in such ranges of the input power.

FIG. 4 illustrates the relation between the logarithmic distortion ratio 10 lg(N/S) and the optical input power level $P_{opt}$ in the transmission system which uses orthogonal polarization shown in FIG. 1. For low optical powers $P_{opt}$, the distortion ratio is dominated by ASE noise and decreases by 1 dB per 1 dB power increment. This is valid for both polarizations 401 and 402. At higher signal power levels $P_{ops}$ there is an increase of the distortion ratio of 2 dB per 1 dB input power raise. This distortion is generated by non-linear effects of the optical fiber, i.e. in particular self phase modulation (SPM).

In the following, the above observations for a one channel system, e.g. one OFDM channel, are extended to multi-channel systems, e.g. a multi-channel OFDM system. By doing this, the effects of non-linear crosstalk between WDM channels, i.e. the effects of cross phase modulation (XPM), can be considered. For this purpose the system shown in FIG. 1 is extended by two additional neighboring OFDM channels with optical powers $P_{ch2}$ and $P_{ch3}$, wherein the optical power of the first channel is referred to as $P_{ch1}$. The channel spacing between the neighboring channels is set to 50 GHz. The simulation model for signal propagation in optical fiber considers the Kerr effect, which is assumed to be responsible for performance limiting distortion.

Figure 5:
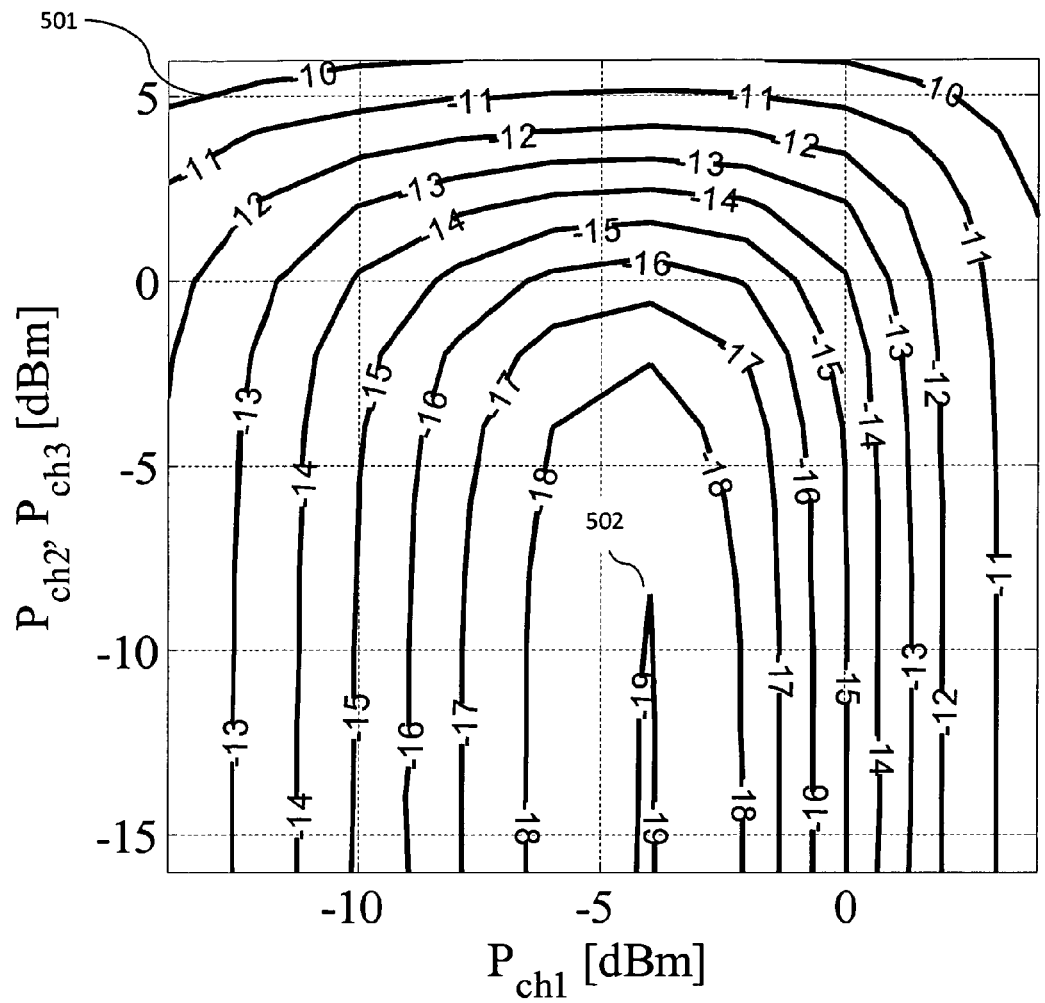
FIG. 5 shows the distortion ratio as a function of optical input power to the respective optical channel and to neighboring channels for an exemplary optical transmission system.

FIG. 5 illustrates inverse SNR values, i.e. logarithmic relative distortion ratio 10 lg(N/S) for the polarization branch i=1 of channel 1. It should be noted that as illustrated in FIG. 4, the second polarization branch comprises similar distortion levels. Besides the optical power $P_{ch1}$ in channel 1, also the optical powers of both neighboring WDM channels are modified with $P_{ch2}=P_{ch3}$. FIG. 5 illustrates lines 501 to 502 of equal logarithmic relative distortion ratio in a $P_{ch1}$, $P_{ch2}=P_{ch3}$ diagram.

If the power levels $P_{ch2}$ and $P_{ch3}$ of the neighboring channels are kept at a constant low value, e.g. below −3 dBm, it can be seen that the curve "distortion ratio 10 lg(N/S) vs. input power level $P_{ch1}$ of channel 1" corresponds to the curves shown in FIG. 4. As shown in FIG. 4, two distinguished regions can be observed. For low values of $P_{ch1}$, ASE noise dominates the overall distortion. At higher levels of input power $P_{ch1}$, distortion due to SPM comes into play. It can be observed that for low power levels of the neighboring channels, there is virtually no distortion generated by non-linear crosstalk or cross phase modulation (XPM) between the neighboring channels and channel 1.

If, on the other hand, the power of the neighboring channels $P_{ch2}$ and $P_{ch3}$ is increased beyond −3 dBm, non-linear crosstalk or XPM influences the distortion ratio of channel 1 at an increasing level. It can observed that similar to SPM, the logarithmic relative distortion ratio 10 lg(N/S) which may be contributed to XPM increases with 2 dB when the power of the co-propagating channels, i.e. $P_{ch2}$ and $P_{ch3}$ in the present example, are raised by 1 dB. It should be noted that this relative relation, i.e. this slope of 2 dB/1 dB power increase, is also applicable if only the power of one neighboring channel $P_{ch2}$ or $P_{ch3}$ is increased, however at a lower absolute value.

The above observations are used in the following to determine the non-linear components of the system model of equation (1), i.e. $n_1(d)$ and $n_2(d)$. As shown by equation (2), the non-linear components $n_1(d)$ and $n_2(d)$ correspond to the inverse signal-to-noise ratio $N_i/S_i$ of the respective polarization branch i=1 or 2. As shown in the FIGS. 3 to 5, the overall inverse signal-to-noise ratio $N_i/S_i$ is made up of different inverse signal-to-noise ratio contributions which are caused by ASE, SPM or XPM. Assuming statistical independence between the contributions, their powers add up accordingly $$\frac{N_i}{S_i} = \frac{N_{ASE,i}}{S_i} + \frac{N_{SPM,i}}{S_i} + \frac{\sum_w N_{XPM,w,i}}{S_i}. \quad (3)$$

Here, $N_{XPM,w,i}$ denotes the power of distortion due to XPM caused by the WDM channel with number w on channel 1. The index i distinguishes between the two orthogonal polarizations.

Based on equation (3) and the observations made with regards to the respective slopes of the distortion ratios contributed to ASE, SPM and XPM, the respective inverse signal-to-noise ratios $$\frac{N_{ASE,i}}{S_i}, \frac{N_{SPM,i}}{S_i} \text{ and } \frac{\sum_w N_{XPM,w,i}}{S_i}$$

can be modeled. For this purpose, a set of model equations can be determined for actual distortion measurements. This means that using the model equations and actual distortion measurements, the respective absolute contributions of ASE, SPM and XPM to the overall inverse signal-to-noise ratio can be determined.

It is important to note that the observed slopes of the noise power contributions may be generalized, especially within the region where the respective part dominates the total power of distortion. In other words, the observed slopes are applicable to optical transmission systems in general. Even when parameters of the transmission system setup are varied, e.g. a different number of fiber spans or a different fiber type, the slopes can still be observed. Consequently, the observed slopes, i.e. in particular 1 dB decrease of $$10 lg\left(\frac{N_{ASE,i}}{S_i}\right)$$

per 1 dB increase of $P_{opt}$, in case of ASE;

2 dB increase of $$10 lg\left(\frac{N_{SPM,i}}{S_i}\right)$$

per 1 dB increase of $P_{opt}$, in case of SPM; and 2 dB increase of $$10 lg\left(\frac{N_{XPM,w,i}}{S_i}\right)$$

per 1 dB increase of the optical power $P_i$, of the neighboring channels w, can be considered to be valid regardless the particular configuration of the transmission system.

Based on the above, a technique can be specified by which the summands of equation (3) can be extracted. For generalization purposes, a WDM system with W channels, with W greater or equal to 2, is considered in the following. In such a W channel WDM system, W+1 measurements of the overall inverse signal-to-noise ratio are made. It should be noted that in the following the index i for polarizations is dropped for simplicity reasons. In total, the measurements and the following calculations will are preferably done for all polarizations separately. Furthermore, it is assumed that a model for the inverse signal-to-noise ratio of channel w=1 is determined without loss of generality. The models for other channels, w=2 . . . W, can be determined accordingly.

In a first step, the inverse SNR $m_o$ at the desired operating point of the transmission system is measured. As mentioned above, this is done for both polarizations. Each co-propagating channel, i.e. w=2 . . . W, generates additive distortion due to XPM within channel w=1, so that the first measurement $m_0$ can be written as $$m_0 = \frac{N_{ASE} + N_{SPM} + \sum_{w=2}^{W} N_{XPM,w}}{S}. \quad (4)$$

An input power increment of $10 \log_{10}(k)$ dB for channel 1 increases distortion due to SPM and decreases relative ASE noise power. The linear representation of the noise power terms requires division of $N_{ASE}/S$ by k, according to the 1 dB decrease of the distortion ratio per 1 dB power increase, and scaling of $N_{SPM}/S$ by $k^2$, according to the 2 dB increment of the distortion ratio per 1 dB optical power raise. By consequence, a second measurement $m_1$ at an increased optical power $P_{ch1}$ can be written as $$m_1 = \frac{N_{ASE}}{kS} + \frac{k^2 N_{SPM}}{S} + \frac{\sum_{w=2}^{W} N_{XPM,w}}{S}. \quad (5)$$

In further measurement steps, the channel 1 goes back to its original power and—one after the other—all remaining W−1 channels perform the same power variation by $10\log_{10}(k)$ dB, which results in measurements $m_2$ to $m_W$ and the respective equations $$m_v = \frac{N_{ASE}}{S} + \frac{N_{SPM}}{S} + \frac{k^2 N_{XPM,v}}{S} + \frac{\sum_{\substack{w=2 \\ w \neq v}}^{W} N_{XPM,w}}{S}, \quad v = 2 \ldots W, \quad (6)$$

where v denotes the neighboring channel for which the input power has been increased by $10\log_{10}(k)$ dB, resulting in W+1 equations. The solution of the set of W+1 equations provides the following equations for the respective inverse signal-to-noise ratio contributions:

$$\frac{N_{XPM,v}}{S} = \frac{m_v - m_0}{k^2 - 1}, \quad v = 2 \ldots W \quad (7)$$

$$\frac{N_{SPM}}{S} = \frac{(W - 2 - k)m_0 + k(k + 1)m_1 - \sum_{w=2}^{W} m_w}{(k + 1)(k^3 - 1)} \quad (8)$$

$$\frac{N_{ASE}}{S} = m_0 - \frac{N_{SPM}}{S} - \sum_{w=2}^{W} \frac{N_{XPM,w}}{S}. \quad (9)$$

These equations comprise k as a free parameter. This parameter k may be selected in a trade-off between safe operation of the WDM channels as well as measurement accuracy.

With the help of equations (7)-(9) it can be determined which contributions of the total noise power stem from ASE noise, SPM and non-linear crosstalk from each individual neighboring WDM channel. In particular, the dominating source of distortion can be identified. Furthermore, when knowing the inverse signal-to-noise ratios $$\frac{N_{ASE}}{S}, \frac{N_{SPM}}{S} \text{ and } \frac{\sum_{v} N_{XPM,v}}{S}$$

at a certain operating point of the transmission system, the overall inverse signal-to-noise ratio N/S can be determined for any arbitrary value of the optical input powers $P_w$ for w=1, ..., W. This is done through the use of equation (3) and the knowledge on the slope of each inverse signal-to-noise ratio contribution. By consequence, a more optimal operating point of the transmission system which exhibits a lower overall inverse signal-to-noise ratio can be determined.

In the following, it is shown how the derived information with regards to the inverse signal-to-noise ratio may be used as a measure for the spectral efficiency which is achievable in a given transmission system. According to Shannon the maximum information-rate which can be transmitted over a band-limited additive white Gaussian noise (AWGN) channel is $$C = B \cdot \log_2\left(1 + \frac{S}{N}\right) = B \cdot \log_2\left(1 + \frac{S}{N_0 B}\right), \quad (10)$$

wherein B is the bandwidth of the band-limited channel and wherein the maximum transmission power is limited. S/N is the signal-to-noise power ratio and $N_0$ denotes the spectral noise power density.

According to the theory, an ideal transmission scheme using forward error correction allows for error-free transmission at the Shannon limit. Dividing equation (10) by the bandwidth B results in the maximum achievable spectral efficiency. If a transmission system using orthogonal polarizations as shown e.g. in FIG. 1 is used, both orthogonal polarizations use the same frequency band and their contributions for the capacity may be added up to obtain a measure for the spectral efficiency of the complete transmission channel comprising both polarizations:

$$\Gamma = \log_2\left(1 + \frac{S_1}{N_1}\right) + \log_2\left(1 + \frac{S_2}{N_2}\right). \quad (11)$$

Figure 6:
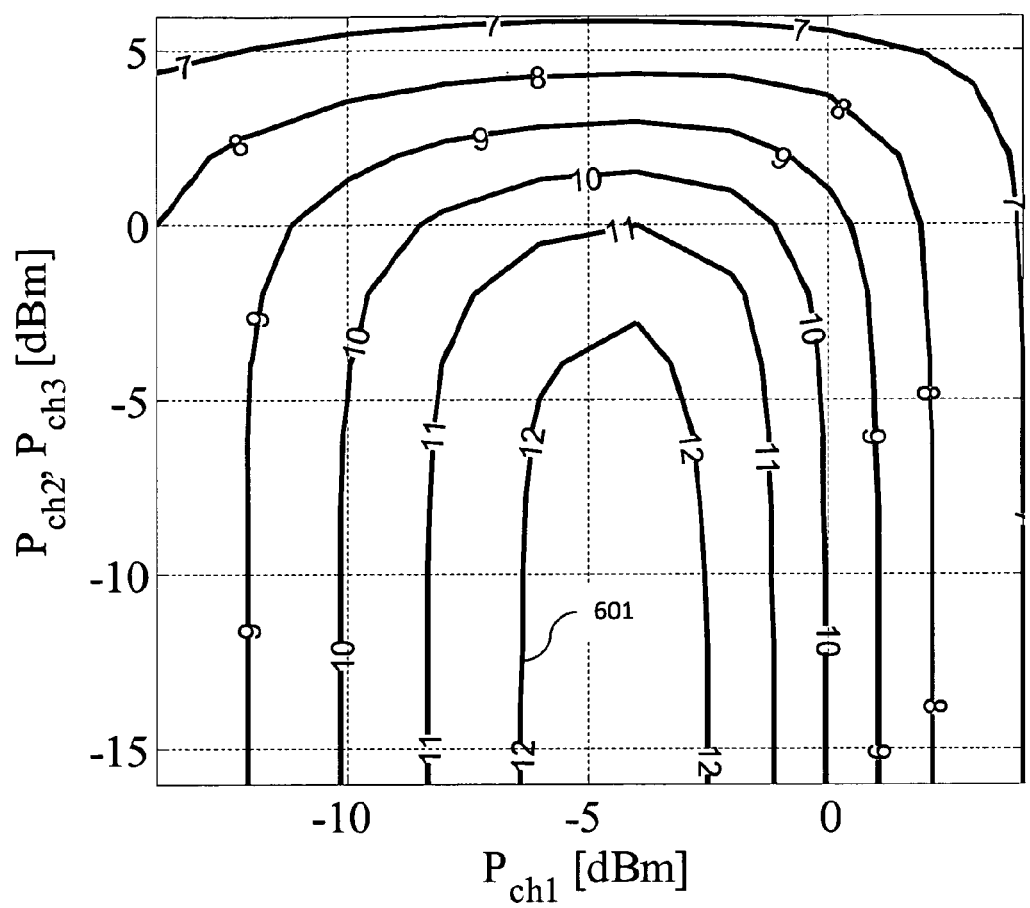
FIG. 6 shows the spectral efficiency as a function of optical input power to the respective optical channel and to neighboring channels for the example of FIG. 5.

By consequence, the estimated relative noise powers presented above can thus be translated into an estimate for the maximum achievable spectral efficiency. For the exemplary 3-channel-scenario of FIG. 5 the maximum achievable spectral efficiency $\Gamma$ is illustrated in FIG. 6. A maximum value for $\Gamma$ of slightly more than 12 bit/s/Hz can be observed (see line 601).

Figure 7:
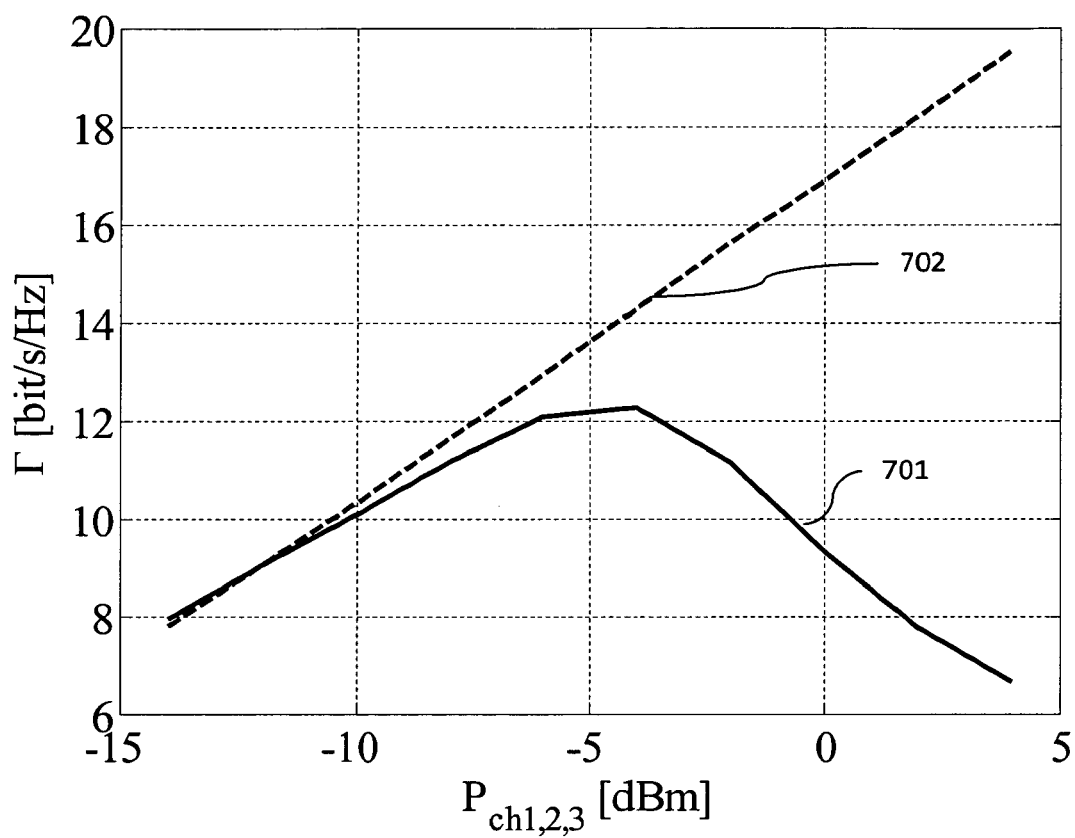
FIG. 7 illustrates the spectral efficiency of an optical channel as a function of optical input power to the influencing optical channels.

For equal levels of input powers $P_{ch1}$, $P_{ch2}$ and $P_{ch3}$ of all three WDM channels of the exemplary 3-channel-scenario of FIG. 5, a curve 701 of the achievable spectral efficiency versus optical input power can be drawn as shown in FIG. 7. For comparison the dashed line 702 gives the result for the linear AWGN channel. The maximum spectral efficiency is reachable for −4 dBm optical input power per WDM channel. For lower power levels the maximum spectral efficiency is limited by ASE noise. At higher power levels, non-linear distortions, i.e. notably SPM and XPM, reduce the capacity whereas in the linear AWGN case (dashed line 702) the achievable spectral efficiency is strictly increasing.

Consequently, the monitoring method described in this document provides a tool for estimating an upper bound for the achievable spectral efficiency within the used OFDM band for the given transmission system. This estimate of the upper bound is independent of the actual operating point at which the implemented OFDM transmission system is actually operated. This implies that the operating point of the system can be optimized. This could be done by adjusting the optical input power of the channels of the transmission system to an operating point which leads to lower inverse signal-to-noise ratios and/or by adjusting the data-rate e.g. by increasing the size of the symbol alphabet. In other words, the above monitoring method allows for an online adjustment of the transmission parameters of a transmission system in accordance with currently observed distortion properties.

It should be noted that the above method for estimating the spectral efficiency can be extended to also consider the guard bands between WDM channels. In this case, the obtained estimates for the achievable spectral efficiency according to equations (10) and (11) should be scaled by the OFDM signal bandwidth divided by the WDM channel spacing.

The above methods have been outlined in the context of single channel or multi-channel optical transmission systems, i.e. point-to-point transmission systems. Within a meshed transparent network the point-to-point scenario may be viewed as a special case. In general, there are many WDM channels which co-propagate on the same links just for parts of their transmission path through the network or which are completely disjoint. Simulations have been carried out where neighboring channels co-propagate on a sub-set of the observed channel's links. In such cases, the monitoring method yields altered absolute noise powers compared to the point-to-point scenarios outlined above. Nevertheless, the results indicate that the slopes within ASE noise dominated and non-linearity dominated regions are the same as shown above. In other words, also meshed optical networks can be monitored and optimized according to the methods outlined above.

Therefore in a meshed transparent network scenario, the presented method is also applicable and can be used for network optimization. In order to achieve the maximum network capacity, one should find optimum launch powers, i.e. the optimal optical input powers to the optical transmission channels. For this purpose, the inverse signal-to-noise distortions according to equations (7) to (9) may be inserted into a W×W distortion matrix D, representing a meshed network having W input channels and W output channels. Each entry at row z and column w of the distortion matrix D represents the distortion within channel z caused by channel w. The distortion matrix D may be used to analyze the impact of one channels' input power on the distortion of another channel. If for example, a channel z is dominantly affected by a certain neighboring WDM channel w, the overall network capacity may be increased by reducing the power of channel w.

Once the optimization procedure with regards to the input powers of the W channels is done, the data-rates of the WDM channels can be adapted according to the estimated capacity. In the case of OFDM transmission this can be accomplished by choosing appropriate symbol alphabets for the sub-carriers.

Figure 8:
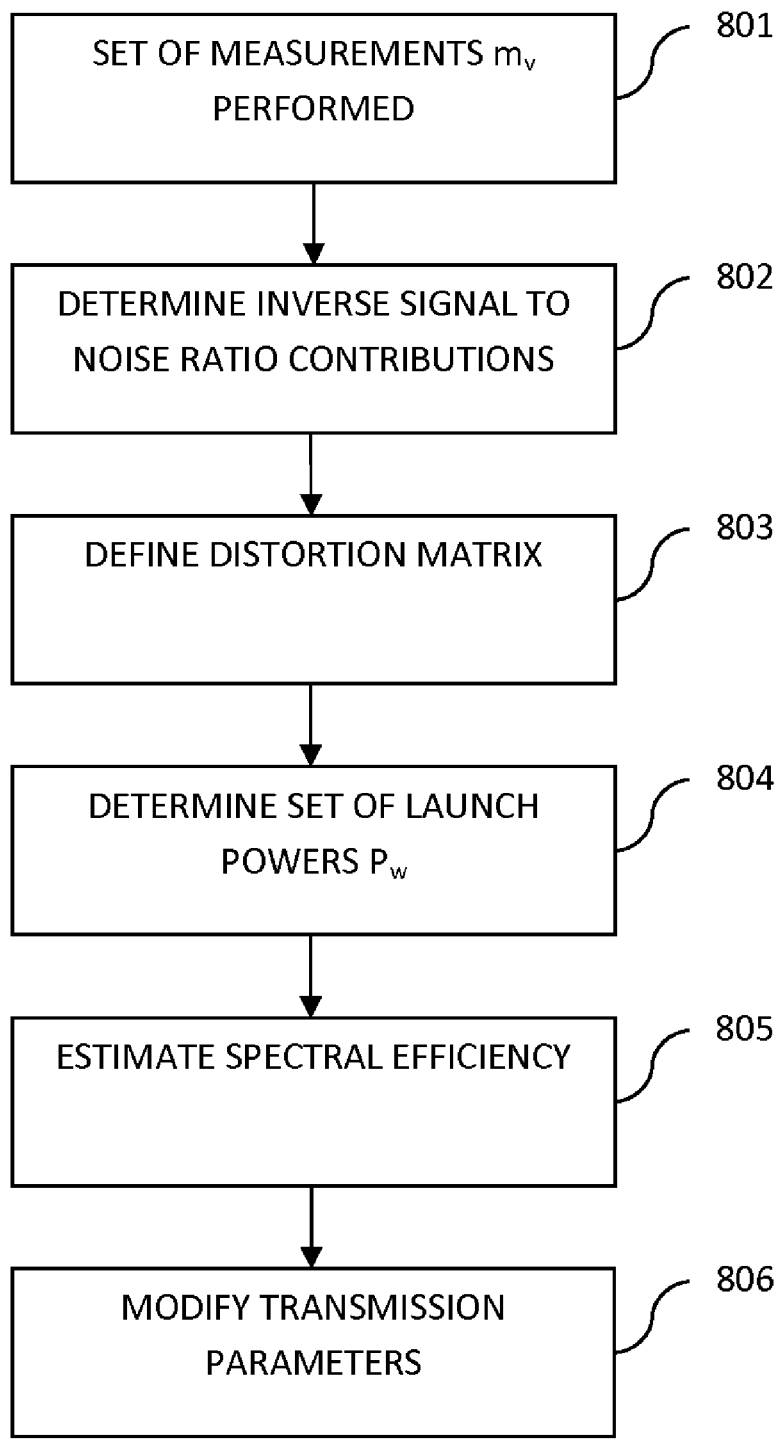
FIG. 8 shows an exemplary flow diagram for an optical monitoring method.

FIG. 8 illustrates an exemplary flow chart for the online optimization process of a meshed optical transmission network. The online optimization process is outlined for the case of a meshed network with W input channels and W output channels. It should be noted, however, that the method is equally applicable to meshed networks having different numbers of input and output channels. Furthermore, it should be noted that the online optimization process also applies to transmission systems making use of orthogonal polarizations. However, for reasons of convenience the additional index i representing possible different polarizations has been omitted in the following.

In a first step 801, a set of measurements $m_v$ is performed, in order to determine the inverse signal-to-noise ratios and their ASE, SPM and XPM contributions. This may be done by the method and the respective equations (7) to (9) outlined above. For the whole network, W+1 measurements $m_v$, with v=0, . . . , W are made as outlined above. Then, in step 802 the inverse signal-to-noise ratio contributions are determined from these measurements $m_v$. This yields the ratios $$\frac{N_{ASE,z}}{S_z}, \frac{N_{SPM,z}}{S_z} \text{ and } \frac{\sum_w N_{XPM,z,w}}{S_z}$$

for all channels z, z=1, . . . , W, at a given point of operation of the meshed optical network. In order to obtain these inverse SNRs from the perspective of channel z, the computation of equations (7) to (9) is carried out after appropriate renumbering of the measurements $m_v$. The point of operation or operating point of the network is defined by the optical input powers $P_w$ of the channels w, for w=1, . . . , W.

In step 803 a distortion matrix D is defined. The distortion matrix D reflects the inverse signal-to-noise ratio contributions that the W input channels have on one another. As such, the ASE and SPM noise contributions form the diagonal of the matrix D, whereas the cross phase modulation terms $$\frac{N_{XPM,z,w}}{S_z}$$

are positioned at the $z^{th}$ row in the $w^{th}$ column, thereby indicating the crosstalk generated by channel w on channel z.

The distortion matrix D represents the overall inverse signal-to-noise ratio and their ASE, SPM and XPM contributions of the meshed optical network at the operating point, i.e. at given optical launch powers $P_w$, for w=1, . . . , W. In step 804, a set of launch power $P_w$ is determined which defines a new operating point with a distortion matrix D having decreased overall inverse signal-to-noise ratios. For this purpose, the knowledge with regards to the slope of the different non-linear contributions ASE, SPM and XPM may advantageously be used. In other words, it may be considered that the logarithmic inverse signal-to-noise ratio of channel z caused by ASE decreases by 1 dB per 1 dB increase of the optical input power $P_z$ of the respective channel z.

the logarithmic inverse signal-to-noise ratio of channel z caused by SPM increases by 2 dB per 1 dB increase of the optical input power $P_w$ of the respective channel z.

the logarithmic inverse signal-to-noise ratio of channel z caused by XPM increases by 2 dB per 1 dB increase of the optical input power $P_w$ of channel w, for all channels w other than z.

The optimal set of input powers $P_w$, for w=1, . . . , W, may be determined through numerical minimization schemes, such as gradient decent schemes. In cases where the W channels of the meshed network have the same bandwidth, the task of finding an optimal set of input powers $P_w$, for w=1, . . . , W comprises minimizing the sum of the matrix entries, i.e.

$$\min_{P_w}\left\{\sum_{z,w} d_{z,w}\right\} = \min_{P_w}\left\{\sum_z \frac{1}{S_z}\left(N_{ASE,z} + N_{SPM,z} + \sum_w N_{XPM,z,w}\right)\right\}, \quad (12)$$

for w=1, . . . , W. In equation (12) $d_{z,w}$ is the entry of the distortion matrix D in row z and column w. If the channels have different bandwidth, then the bandwidth can be incorporated as a weight in the above minimization function thereby putting more emphasis on channels with higher bandwidth.

Once an optimal set of optical input powers $P_w$, for w=1, . . . , W, has been determined, the additional available network capacity can be used. An estimate of the additionally gained network capacity is obtained from the spectral efficiency equations (10) and (11). I.e. using the reduced values of the overall inverse signal-to-noise ratios, the spectral efficiency $\Gamma$ can be determined for each channel z, z=1, . . . , W. The estimation of the spectral efficiency $\Gamma$ is done in an optional step 805.

The additional spectral efficiency may then be exploited by modifying the coding/decoding schemes, as well as the modulation/demodulation schemes used at the optical transmitter and receivers. In the case of OFDM, the modulation scheme may be adapted to the available spectral efficiency. In particular, the number of bits encoded into one OFDM symbol may be increased, while keeping the symbol rate unchanged. By way of example, a QAM16 modulation scheme may be switched to a QAM64 modulation scheme, thereby allowing for a 4 times higher throughput. Such changes may be performed online, i.e. in a running network, thereby adapting the network throughput to the currently achievable spectral efficiency. The modification of the transmission parameters according to the monitored network condition is performed in step 806.

Figure 9:
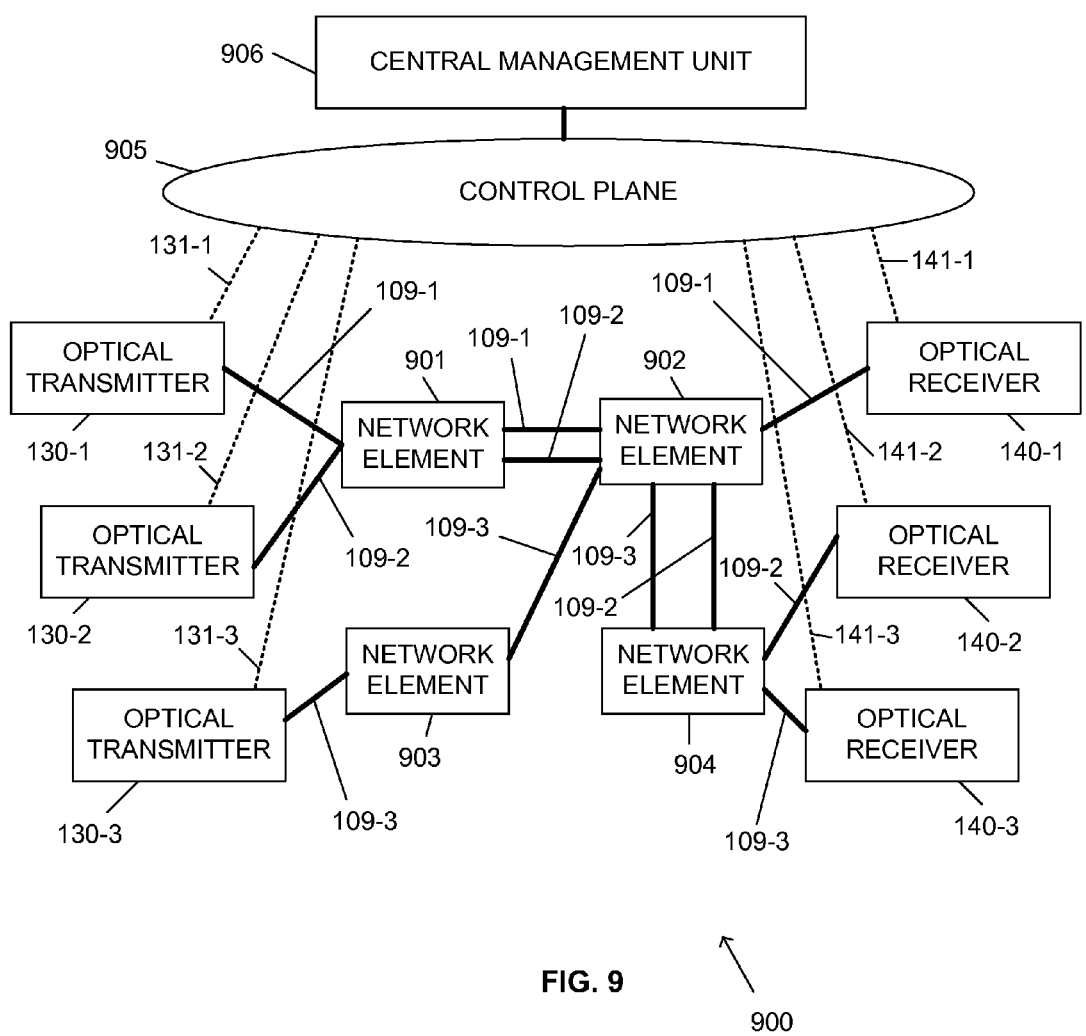
FIG. 9 shows an exemplary optical meshed network.

FIG. 9 illustrates an exemplary optical meshed network 900 which comprises three optical transmitters 130-1, 130-2, 130-3, three optical receivers 140-1, 140-2, 140-3 and four further network elements 901, 902, 903, 904 such as optical multiplexers and/or switches. The optical transmitters 130-1, 130-2, 130-3 and the optical receivers 140-1, 140-2, 140-3 comprise interfaces 131-1, 131-2, 131-3 and 141-1, 141-2, 141-3, respectively, to the control plane 905, in order to exchange information among each other and/or with a central coordination or management unit 906.

Furthermore, FIG. 9 shows three optical channels 109-1, 109-2, 109-3 through the meshed network 900. As can be seen, channels 109-1 and 109-2 run parallel between the network nodes 901 and 902. By way of example, the two channels 109-1 and 109-2 may share the same optical fiber between the two network nodes 901, 902. In this section, there may be crosstalk between the two optical channels 109-1, 109-2, i.e. the optical channel 109-1 may affect the inverse SNR of the optical channel 109-2 and vice-versa. It can also be seen that the pair of channels 109-2 and 109-3 run in parallel between the network nodes 902 and 904. The two optical channels 109-2 and 109-3 may therefore affect each others inverse SNR in this section of the optical transmission network 900.

The above described methods and systems may be applied to the optical transmission network 900. By way of example, the central management unit 906 may trigger the transmitters 130-1, 130-2, 130-3 through the interfaces 131-1, 131-2, 131-3 to modify the input power levels to the channels 109-1, 109-2, 109-3 in a predetermined manner as outlined in the present document. At the same time, the optical receivers 140-1, 140-2, 140-3 may be triggered via the interfaces 141-1, 141-2, 141-3 to perform measurements of the inverse SNR of the channels 109-1, 109-2, 109-3, respectively. The measurement results may be forwarded to the central management unit 906 via the interfaces 141-1, 141-2, 141-3, which then determines the optimum input power levels to the transmitters 130-1, 130-2, 130-3. These optimum input power levels are communicated to the transmitters 130-1, 130-2, 130-3 via the interfaces 131-1, 131-2, 131-3. Alternatively, the digital signal processing means in the transmitters or receivers may be used in order to determine the optimum input power levels to the transmitters 130-1, 130-2, 130-3.

In addition, the maximum throughput through the different channels 109-1, 109-2, 109-3 may be determined by the central management unit 906, the transmitters 130-1, 130-2, 130-3 or the receivers 140-1, 140-2, 140-3. The information on the maximum possible throughput may be used to set parameters of the optical transmission channels 109-1, 109-2, 109-3, in order to increase their respective throughput. This may comprise a modification of the underlying modulation scheme.

It may be appreciated that the network topology of an optical meshed network 900 may change, e.g. due to modified switching of the optical channels 109-1, 109-2, 109-3. By consequence, the network topology and the respective interaction between the channels 109-1, 109-2, 109-3 is changed. Such changes may trigger a new measurement of the inverse SNRs and thereby lead to updated input power levels and/or modified throughputs in the different channels 109-1, 109-2, 109-3.

In the present document a method and system for monitoring non-linear distortions in a meshed optical transmission network have been outlined. The monitoring is performed based on measurements of the inverse signal-to-noise ratios at an optical receiver and can be performed without adding significant additional computational complexity. The monitoring may be performed on the digital signal processor already available in most optical receivers, e.g. in the units 118 and 119 of FIG. 1. Using the knowledge on the inverse signal-to-noise ratios, their ASE, SPM and XPM contributions and their typical curve progressions with regards to the optical channel input powers, an optimal operating point of the meshed optical network can be determined. Such operating point is typically defined by a set of input powers $P_w$. If the network is operated at this optimal operating point, additional network capacity can be made available which can be exploited by adapting the respective coding/modulation schemes.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A coherent optical receiver comprising
a coherent optical reception unit, operable to receive an optical signal sent by a corresponding optical transmitter over a first optical transmission channel of an optical transmission network;
an optical-to-digital converter, operable to convert the optical signal into a digital signal; and
a digital post-processing unit operable to
perform linear equalization of distortions incurred by the optical signal during transmission over the first channel;
provide measured data by measuring the inverse signal-to-noise ratio of the first channel for a plurality of input power levels used by the first channel and a second optical transmission channel of the optical transmission network, which is affecting the first channel;
determine a contribution of the second channel to the inverse signal-to-noise ratio of the first channel based on the measured data; and
determine the input power level to the second channel, such that an overall throughput of the first and second channel is maximized.

2. The receiver of claim 1, wherein the digital post-processing unit is operable to provide the measured data by measuring the inverse signal-to-noise ratio of the first channel:
at a first value of the input power used by the first channel, while the input power used by the second channel is at a second value, yielding a measured data $m_0$ of the inverse signal-to-noise ratio;
at the first value increased by a value $10 \cdot \lg(k)$ of the input power used by the first channel, while the input power used by the second channel is at the second value, yielding a measured data $m_1$ of the inverse signal-to-noise ratio; wherein k is a positive real number; and
at the first value of the input power used by the first channel, while the input power used by the second channel is at the second value increased by the value $10 \cdot \lg(k)$, yielding a measured data $m_2$ of the inverse signal-to-noise ratio.

3. The receiver of claim 2, wherein the digital post-processing unit is further operable to determine a contribution of self phase modulation to the inverse signal-to-noise ratio; and
amplified spontaneous emission to the inverse signal-to-noise ratio.

4. The receiver of claim 3, wherein the contribution of amplified spontaneous emission, the contribution of self phase modulation and the contribution of the second channel add up to the inverse signal-to-noise ratio of the first channel.

5. The receiver of claim 4, wherein
the contribution of the second channel is given by $$\frac{N_{XPM}}{S} = \frac{m_2 - m_0}{k^2 - 1};$$

the contribution of self phase modulation is given by $$\frac{N_{SPM}}{S} = \frac{-km_0 + k(k+1)m_1 - m_2}{(k+1)(k^3 - 1)}; \text{ and}$$

the contribution of amplified spontaneous emission is given by $$\frac{N_{ASE}}{S} = m_0 - \frac{N_{SPM}}{S} - \frac{N_{XPM}}{S}.$$

6. The receiver of claim 1, further comprising:
an interface to a control plane of the optical transmission network operable to exchange information about the input power levels used by the first and the second channel with the corresponding transmitter of the first channel and a transmitter of the second channel, respectively.

7. The receiver of claim 6, wherein the interface is further operable to exchange information regarding the contribution of the second channel to the inverse signal-to-noise ratio of the first channel.

8. An optical transmitter of a second optical transmission channel which is affecting a first optical transmission channel in an optical transmission network, the transmitter comprising:
an optical laser operable to generate an optical signal of the second channel;
an interface operable to exchange information with an optical receiver of the first channel; and
a digital processing unit;
wherein the interface is operable to receive measured data on the inverse signal-to-noise ratio of the first channel for a plurality of input power levels used by the first and the second channel;
wherein the optical laser is operable to modify an input power level used by the second channel to a plurality of input power levels for determination of the measured data;
wherein the digital processing unit is operable to determine a contribution of the second channel to the inverse signal-to-noise ratio of the first channel based on the measured data; and
the digital processing unit is operable to determine the input power to the second channel, such that an overall throughput of the first and second channel is maximized.

9. A method for controlling an optical transmission network comprising a first and a second optical transmission channel, the first channel being affected by the second channel, the method comprising:
measuring the inverse signal-to-noise ratio of the first channel to obtain measured data on the inverse signal-to-noise ratio of the first channel for a plurality of input power levels used by the first and second channels;
determining a contribution of the second channel to the inverse signal-to-noise ratio of the first channel based on the measured data; and determining the input power levels to the second channel, such that an overall throughput of the first and second channels is maximized.

10. The method of claim 9, wherein the step of determining the contribution comprises:
determining the contribution of the second channel to the logarithmic inverse signal-to-noise ratio of the first channel using increases of 2 dB per 1 dB increase of the input power level used by the second channel.

11. The method of claim 9, wherein the step of determining the input power level used by the second channel comprises minimizing the sum of the inverse signal-to-noise ratio of the first channel and an inverse signal-to-noise ratio of the second channel.

12. The method of claim 9, further comprising:
determining the input power to the first channel, such that an overall throughput of the first and second channel is maximized; and
determining a maximum possible throughput of the first channel at the determined input power levels to the first and second channels.

13. The method of claim 12, further comprising:
adapting a transmitter and/or a receiver of the first channel such that data is transmitted over the first channel with the maximum possible throughput.

14. An optical transmission network comprising:
a first and a second optical transmission channel; wherein the second channel affects the first channel;
a first optical transmitter and a first optical receiver associated with the first channel;
a second optical transmitter associated with the second channel; and
a control unit operable to:
set an input power level used by the first and second channels at the first and second transmitter, respectively, to a plurality of input power levels for measurement of an inverse signal-to-noise ratio of the first channel;
collect measured data at the first optical receiver on the inverse signal-to-noise ratio of the first channel for the plurality of input power levels used by the first and the second channel;
determine a contribution of the second channel to the inverse signal-to-noise ratio of the first channel based on the measured data; and
determine the input power level to the second channel, such that an overall throughput of the first and second channel is maximized.

15. The optical transmission network of claim 14, wherein the first and second optical transmitter and the first optical receiver comprise interfaces for communicating with the control unit.

16. The optical transmitter of claim 8, wherein the plurality of input power levels comprise:
a first value of the input power used by the first channel;
a second value of the input power used by the second channel;
a third value of the input power used by the first channel equal to the first value increased by a value $10 \cdot \lg(k)$; and
a fourth value of the input power used by the second channel equal to the second value increased by the value $10 \cdot \lg(k)$, wherein k is a positive real number.

17. The optical transmitter of claim 16,
wherein the first value of the input power used by the first channel and the second value of the input power used by the second channel yields a measured data $m_0$ of the inverse signal-to-noise ratio;
wherein the third value of the input power used by the first channel and the second value of the input power used by the second channel yields a measured data $m_1$ of the inverse signal-to-noise ratio;
wherein the first value of the input power used by the first channel and the fourth value of the input power used by the second channel yields a measured data $m_2$ of the inverse signal-to-noise ratio.

18. The optical transmission network of claim 14, wherein the plurality of input power levels comprise:
a first value of the input power used by the first channel;
a second value of the input power used by the second channel;
a third value of the input power used by the first channel equal to the first value increased by a value $10 \cdot \lg(k)$; and
a fourth value of the input power used by the second channel equal to the second value increased by the value $10 \cdot \lg(k)$, wherein k is a positive real number.

19. The optical transmission network of claim 18,
wherein the first value of the input power used by the first channel and the second value of the input power used by the second channel yields a measured data $m_0$ of the inverse signal-to-noise ratio;
wherein the third value of the input power used by the first channel and the second value of the input power used by the second channel yields a measured data $m_1$ of the inverse signal-to-noise ratio;
wherein the first value of the input power used by the first channel and the fourth value of the input power used by the second channel yields a measured data $m_2$ of the inverse signal-to-noise ratio.

20. The optical transmission network of claim 19, wherein the control unit is operable to determine:
the contribution of the second channel by $$\frac{N_{XPM}}{S} = \frac{m_2 - m_0}{k^2 - 1};$$

the contribution of self phase modulation by $$\frac{N_{SPM}}{S} = \frac{-km_0 + k(k+1)m_1 - m_2}{(k+1)(k^3 - 1)}; \text{ and}$$

the contribution of amplified spontaneous emission by $$\frac{N_{ASE}}{S} = m_0 - \frac{N_{SPM}}{S} - \frac{N_{XPM}}{S}.$$

* * * * *